(12) United States Patent
Sayre et al.

(10) Patent No.: US 10,198,580 B2
(45) Date of Patent: Feb. 5, 2019

(54) BEHAVIOR SPECIFICATION, FINDING MAIN, AND CALL GRAPH VISUALIZATIONS

(71) Applicant: UT Battelle, LLC, Oak Ridge, TN (US)

(72) Inventors: Kirk D. Sayre, Oak Ridge, TN (US); Richard A. Willems, Oak Ridge, TN (US); Stephen Lanse Lindberg, Oak Ridge, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 0 days.

(21) Appl. No.: 15/906,831

(22) Filed: Feb. 27, 2018

(65) Prior Publication Data

US 2018/0189487 A1 Jul. 5, 2018

Related U.S. Application Data

(63) Continuation of application No. 14/820,976, filed on Aug. 7, 2015, now abandoned.

(60) Provisional application No. 62/034,410, filed on Aug. 7, 2014.

(51) Int. Cl.
*G06F 21/00* (2013.01)
*G06F 21/56* (2013.01)

(52) U.S. Cl.
CPC .................. *G06F 21/563* (2013.01)

(58) Field of Classification Search
CPC ................................................. G06F 21/563
See application file for complete search history.

(56) References Cited

U.S. PATENT DOCUMENTS 5,778,212 A * 7/1998 Dehnert ................. G06F 8/443
717/146
5,894,311 A * 4/1999 Jackson ............ G06F 17/30398
345/440

(Continued)

OTHER PUBLICATIONS

Hall et al., Efficient Call Graph Analysis, Sep. 1992, ACM, ACM Letters on Programming Languages and Systems vol. 1 No. 3, pp. 227-242 (Year: 1992).*

(Continued)

*Primary Examiner* — John B King
(74) *Attorney, Agent, or Firm* — Brinks Gilson & Lione

(57) ABSTRACT

A process transforms compiled software into a semantic form. The process transforms the code into a semantic form. The process analyzes behavior functionality by processing precise programming behavior abstractions stored in a memory and classifies the code as malware based on the code behavior. Another method identifies the starting point of execution of a compiled program. The method calculates a complexity measure by calculating the number of potential execution paths of local functions; identifies the number of arguments passed to local functions; and identifies the starting point of execution of the compiled program. Another method provides interactive, dynamic visualization of a group of related functions wherein a user can explore the rendered graph and select a specific function and display functions that are color coded by their ancestral relation and their function call distance to the selected function.

18 Claims, 19 Drawing Sheets

(56) References Cited

U.S. PATENT DOCUMENTS

| | | | | |
|---|---|---|---|---|
| 6,163,882 | A * | 12/2000 | Masuyama | G06F 8/443 717/143 |
| 6,356,285 | B1 * | 3/2002 | Burkwald | G06F 8/75 345/440 |
| 6,363,435 | B1 * | 3/2002 | Fernando | G06F 9/542 719/315 |
| 6,721,275 | B1 * | 4/2004 | Rodeheffer | H04L 12/462 370/238 |
| 7,996,825 | B2 * | 8/2011 | Chakrabarti | G06F 8/4441 717/140 |
| 8,997,256 | B1 * | 3/2015 | Rogers | G06F 21/16 726/32 |
| 2003/0233640 | A1 * | 12/2003 | Reynaud | G06F 8/452 717/154 |
| 2004/0111719 | A1 * | 6/2004 | Civlin | G06F 8/60 717/159 |
| 2005/0223238 | A1 * | 10/2005 | Schmid | G06F 21/563 713/188 |
| 2009/0293049 | A1 * | 11/2009 | Gorelkina | G06F 11/3612 717/157 |
| 2013/0198841 | A1 * | 8/2013 | Poulson | G06F 21/51 726/23 |
| 2013/0263101 | A1 * | 10/2013 | Dawson | G06F 9/5044 717/157 |
| 2013/0290936 | A1 * | 10/2013 | Rhee | G06F 11/3636 717/128 |
| 2014/0040869 | A1 * | 2/2014 | Park | G06F 11/3612 717/133 |
| 2014/0189657 | A1 * | 7/2014 | Guarnieri | G06F 11/3604 717/133 |
| 2014/0258990 | A1 * | 9/2014 | Klic | G06F 11/3636 717/128 |
| 2015/0104106 | A1 * | 4/2015 | Elinas | G06K 9/4638 382/201 |
| 2015/0309813 | A1 * | 10/2015 | Patel | G06F 8/75 703/22 |
| 2016/0357965 | A1 * | 12/2016 | Prowell | G06F 21/566 |

OTHER PUBLICATIONS

Hu et al., Large-Scale Malware Indexing Using Function-Call Graphs, Nov. 9-13, ACM, CCS '09 (Year: 2009).*

Joris Kinable, Malware Detection Through Call Graphs, Jun. 30, 2010, Master's Thesis Aalto University (Year: 2010).*

* cited by examiner

```
//=========================================
START_BSU KeyLoggerToFile( File ) :

DESCRIPTION:
"
See if key presses are being trapped and logged to a file.
"

BSU B1: GetKeyPress( $key_press )
BSU B2: FileWriteComplete( File=, $key_press)

RULE: true -> [B1, B2]

END_BSU
//=========================================
```

FIGURE 3

```
//==========================================================
START_BSU GetKeyPress( KeyPress ) :

DESCRIPTION:
"
Get the current key being pressed.
"

// Get the key press as an ASCII value.
BSU B1: GetKeyboardState( $keyboard_state )
BSU B2: ToAscii( $keyboard_state, KeyPress== )

// Just get the raw result from GetKeyNameText().
BSU B3: GetKeyNameText( KeyPress== )

RULE: true -> [ B1, B2 ]
RULE: true -> [ B3 ]

END_BSU
//==========================================================
```

FIGURE 4

```
//=====================================================
START_BSU GetKeyNameText( KeyPress ) :

DESCRIPTION:
"
A call to GetKeyNameText().
"

// int WINAPI GetKeyNameText(
//   _In_   LONG   iParam,
//   _Out_  LPTSTR lpString,
//   _In_   int    cchSize
// );
CALL C1_A: GetKeyNameTextA( _, KeyPress=_, _ )
CALL C1_W: GetKeyNameTextW( _, KeyPress=_, _ )

RULE: true -> [C1_A]
RULE: true -> [C1_W]

END_BSU
//=====================================================
```

FIGURE 5

```
//========================================================
START_BSU ToAscii( KeyboardState, KeyValue ) :

DESCRIPTION:
"
A call to ToAscii().
"

// int WINAPI ToAscii(
//   _In_       UINT uVirtKey,
//   _In_       UINT uScanCode,
//   _In_opt_   const BYTE *lpKeyState,
//   _Out_      LPWORD lpChar,
//   _In_       UINT uFlags
// );
CALL C1: ToAscii( _, _, KeyboardState_, KeyValue_, _ )

RULE: true -> [C1]

END_BSU
//========================================================
```

FIGURE 6

```
//================================================
START_BSU GetKeyboardState( KeyboardState ) :

DESCRIPTION:
"
A call to GetKeyboardState().
"

// BOOL WINAPI GetKeyboardState(
//   _Out_  PBYTE  lpKeyState
// );
CALL C1: GetKeyboardState( KeyboardState=_ )

RULE: true -> [C1]

END_BSU
//================================================
```

FIGURE 7

```
// ###############################################################
START_BSU FileWriteComplete( FileName, Data );

DESCRIPTION:
"
A complete file write operation. This includes opening the file for
writing, writing to the file, and closing the file.
"

BSU doFileOpen:  FileOpenWrite( $file, FileName=$file_name )
BSU doFileWrite: FileWrite( $file, Data=_ )
BSU doFileClose: FileClose( $file )

RULE: true -> [ doFileOpen, doFileWrite, doFileClose ]

END_BSU
// ###############################################################
```

FIGURE 8

```
// ##############################################################
START_BSU FileOpenWrite( FILE, FileName ):

DESCRIPTION:
"
Open a file for writing.
"

CALL doOpenWrite:   @FILE=fopen( FileName=_, str_val(0,"w") )
CALL doOpenAppend1: @FILE=fopen( FileName=_, str_val(0,"a") )
CALL doOpenAppend2: @FILE=fopen( FileName=_, str_val(0,"a+") )
// OF_READWRITE 0x00000002
CALL doOpenFile1: @FILE=OpenFile( FileName=_, _, 2 )
// OF_WRITE 0x00000001
CALL doOpenFile2: @FILE=OpenFile( FileName=_, _, 1 )

// GENERIC_WRITE = 0x40000000 (1073741824)
CALL doCreateFile1_1a: @FILE=CreateFileA( FileName=_, 1073741824, _, _, _,
_, _ )
CALL doCreateFile1_2a: @FILE=CreateFileW( FileName=_, 1073741824, _, _, _,
_, _ )

// FILE_WRITE_DATA
CALL doCreateFile1_1: @FILE=CreateFileA( FileName=_, 2, _, _, _, _, _ )
CALL doCreateFile1_2: @FILE=CreateFileW( FileName=_, 2, _, _, _, _, _ )
CALL doCreateFile2_1: @FILE=CreateFileA( FileName=_, 1, _, _, _, _, _ )
CALL doCreateFile2_2: @FILE=CreateFileW( FileName=_, 1, _, _, _, _, _ )

RULE: true -> [doOpenWrite]
RULE: true -> [doOpenAppend1]
RULE: true -> [doOpenAppend2]
RULE: true -> [doOpenFile1]
RULE: true -> [doOpenFile2]
RULE: true -> [doCreateFile1_1a]
RULE: true -> [doCreateFile1_2a]
RULE: true -> [doCreateFile1_1]
RULE: true -> [doCreateFile1_2]
RULE: true -> [doCreateFile2_1]
RULE: true -> [doCreateFile2_2]

END_BSU

```
// ################################################################
START_BSU FileWrite( FILE, Data ):

DESCRIPTION:
"
Write to an opened file.
"

CALL doWriteFputs: fputs( Data=_, FILE=_ )
CALL doWriteFwrite: fwrite( Data=_, _, _, FILE=_ )
CALL doWriteFile: WriteFile( FILE=_, Data=_, _, _ )
// TODO: Need to make a list of everything printed out by fprintf().
CALL doFprintf: fprintf( FILE=_, Data=_ )

RULE: true -> [doWriteFputs]
RULE: true -> [doWriteFwrite]
RULE: true -> [doWriteFile]
RULE: true -> [doFprintf]

END_BSU

```
// ###############################################################
START_BSU FileClose( FILE ):

DESCRIPTION:
    "
    Close a file.
    "

CALL doClose: fclose( FILE=$file )
    CALL doCloseHandle: CloseHandle( FILE=$file )

RULE: true -> [doClose]
    RULE: true -> [doCloseHandle]

END_BSU

BEHAVIOR SPECIFICATION, FINDING MAIN, AND CALL GRAPH VISUALIZATIONS

RELATED APPLICATION

This application claims the benefit of priority of U.S. Provisional Pat. App. No. 62/034,410 filed Aug. 7, 2014 and titled "Behavior Specification and Finding Main," and is a continuation of U.S. patent application Ser. No. 14/820,976, filed Aug. 7, 2015, and titled "Behavior Specification and Finding Main, and Call Graph Visualizations," both of which are incorporated by reference.

STATEMENT REGARDING FEDERALLY SPONSORED RESEARCH AND DEVELOPMENT

This invention was made with United States government support under Contract No. DE-AC05-00OR22725 awarded by the United States Department of Energy. The United States government has certain rights in the invention.

BACKGROUND

1. Technical Field

This disclosure relates to systems that monitor program behavior and specifically to systems that identify patterns in external function calls, systems that find the starting execution point of a compiled program, and an interactive user interface that differentiates software call functions.

2. Related Art

Software controls many aspects of systems used in our daily life. However, most source code is complex, making it difficult to track, identify errors, detect vulnerabilities, or detect malware. Current design and coding methods are vulnerable to malicious software that attempts to disable or damage computer programs or the computers themselves. Such code is usually transformed from source code into a target machine language through compilers that also may insert vulnerabilities into the compiled executable program. Some techniques used to detect malware employ only functional testing. Unfortunately, functional testing alone is incapable of catching many types of errors and vulnerabilities. Many tests are not exhaustive and do not scale to the length and functionality of the machine code.

When validating code, sometimes it is necessary to process machine language. Analysis of a compiled code, whether by manual or automated methods, typically focuses on the unique functionality of the executable code, not on the common start up and shut down functionality of the code.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is exemplary KeyLoggerToFile key logging BSU.
FIG. 4 is exemplary GetKeyPress key logging BSU.
FIG. 5 is exemplary GetKeyNameText key logging BSU.
FIG. 6 is exemplary ToAscii key logging BSU.
FIG. 7 is exemplary GetKeyboardState key logging BSU.
FIG. 8 is exemplary FileWriteComplete key logging BSU.
FIG. 9 is exemplary FileOpenWrite key logging BSU.
FIG. 10 is exemplary FileWrite key logging BSU.
FIG. 11 is exemplary FileClose key logging BSU.

DETAILED DESCRIPTION OF THE PREFERRED EMBODIMENTS

Figure 1:
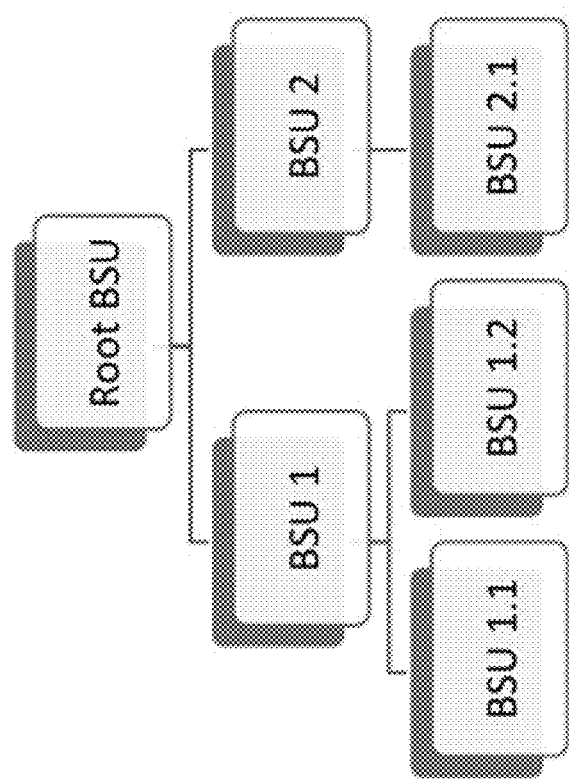
FIG. 1 is a hierarchical view of a Behavior Specification Unit or BSU.

This disclosure describes a novel compiler agnostic system that automatically identifies where the functionality of a program (that may include application software, operating system software, and/or software libraries/tools) begins and ends, and detects malicious software by analyzing program behavior. Operating system software manages computer hardware and software resources and provides common services for computer programs. Application software (an application) is a set of computer programs designed to permit the user to perform a group of coordinated functions, tasks, or activities. Application software cannot run on itself but is dependent on system or operating software to execute.

The novel compiler agnostic system recognizes specific classes of program behavior without decompiling the machine language into its original source code. The system recognizes specific program behaviors by identifying patterns in external function call behavior. The system includes recognizer modules called Behavior Specification Units (BSUs) that abstract targeted program behavior, identify undesired behavior, and add semantic descriptions of the targeted code.

Some BSUs are organized in a hierarchical structure. These BSUs abstract program behavior as compositions or sets of lower-level behaviors. Through the use of a knowledge base that stores complex structured and unstructured behavior information in structured form in a local or remote database stored in a unitary or distributed computing memory, high level precise behavior abstractions are generated and stored in a BSU repository, library, or a BSU enterprise data warehouse. In some systems, the libraries include a collection of behavior abstractions stored in a file. Each BSU in a library has a name, and each recognizes a specific class of behavior. Some systems define precise behavior abstractions through a Domain Specific Language (DSL) and subject matter experts. A subject matter expert or expert system is a computer system that emulates the decision-making ability of a human expert. The BSUs are used to analyze the targeted software's behavioral functionality by first discovering the full, general program behavior and then classifying the general program behavior against the abstracted behavior stored in the BSU repositories or libraries. The behaviors abstracted via classification against the selected BSUs generate a behavior analysis that identifies malware and/or classifies program functionality.

In the behavior computation process that classifies program behaviour against the BSUs, machine code is electronically transformed into a functional specification of the program behavior (a semantic representation of the program rather than a syntactic representation) by processing the targeted code with the functional effects of the machine instructions contained in the targeted code. The machine instruction functional semantics are stored in an instruction semantics repository that may comprise a library or an instruction semantic enterprise data warehouse. The semantic form of the targeted code is then transformed into a structured form by a Hyperion-like or Hyperion system. The Hyperion system is a static program analysis tool that uses a semantic machine instruction behaviour language like the semantic language developed by Oak Ridge National Laboratory. The Hyperion system statically extracts the behavior of targeted software to identify software functionality and security properties. The analysis of the functionality reveals security attributes, which are specialized functional behaviors of the targeted software.

For instructional purposes explaining BSU behavior, the behavior computation process is described through an exemplary process that detects key logging (although it may detect and identify other security risks with other functionality). Key logging tracks or logs keys struck on a keyboard, typically in a covert manner. The BSU behaviors are represented in the form of pairs, where each pair comprises a predicate, which is a Boolean like expression that states under what conditions certain actions are executed by a program. The second element of the BSU is the action taken by the program when the predicate is true. The actions are represented as function calls, which are the program calls made under certain predicate conditions. The function calls are represented with the name of the called function and a parenthesized argument list used in the function call.

Figure 2:
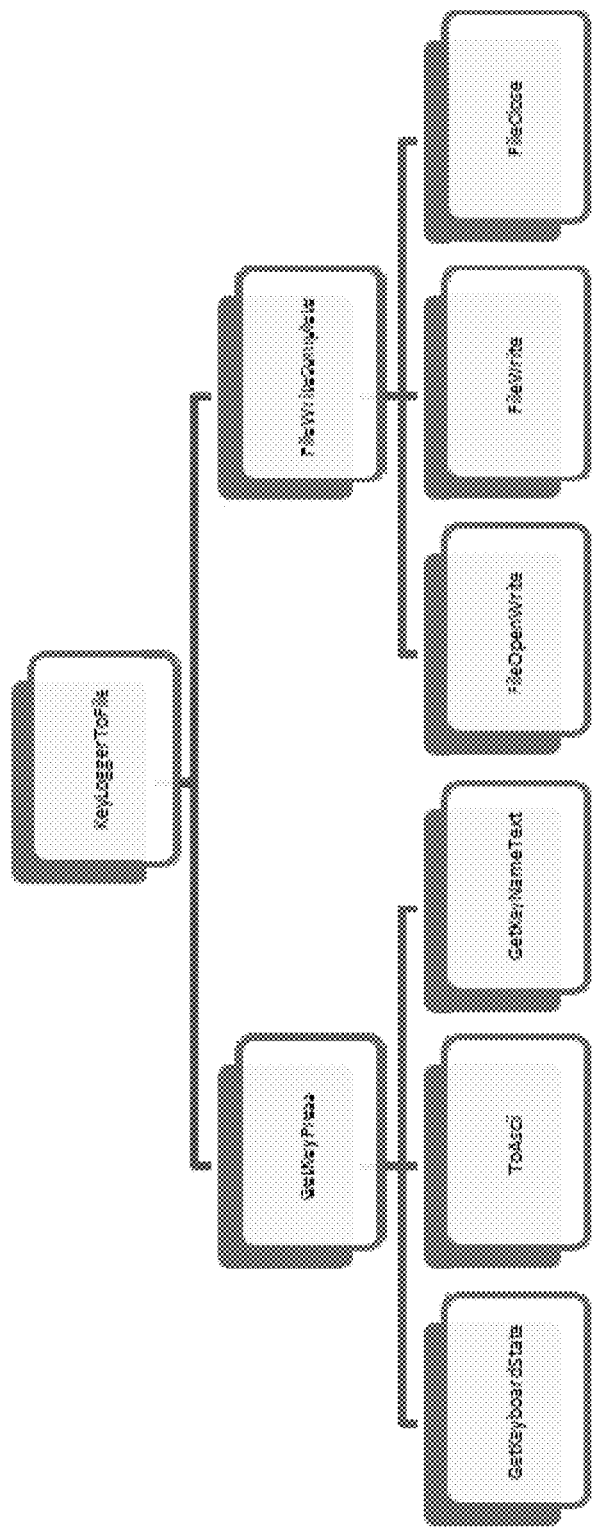
FIG. 2 is a key logger BSU hierarchy.

The BSUs are written as a single behavior unit or one that is linked or associated with many behaviors such as the hierarchical BSU structures shown in FIGS. 1 and 2. In FIG. 2, the behavior computation process is looking for malicious behavior that tracks and/or logs key presses. When key logging behavior occurs in an analysed program, the KeyloggerToFile BSU (FIG. 3) will recognize the key logging behaviour as capturing a key press (recognized by a lower level GetKeyPress BSU) followed by writing the key press to a file (recognized by a lower level FileWriteComplete BSU). Note that when a key press event occurs the Get-KeyPress BSU (FIG. 4) captures the keyboard state, where it was matched in the behavior of the local function, and identifies the key that was pressed. It is possible for a key to be in multiple states. A key may be in a pressed state and in a toggled state, for example.

In the Windows environment the key logger functionality may be implemented in different ways, such as by capturing a key press event in different ways. Two such ways of capturing a key press are represented in the GetKeyPress BSU (FIG. 4). One way to capture a key press is to perform the behaviour represented by the GetKeyboardState BSU followed by the behaviour represented by the ToAscii BSU. ToAscii is a leaf level BSU which defines behaviour for translating the raw key press results into an ASCII value. A leaf level is the lowest level in the BSU hierarchy that includes details of the defined behaviour. As shown in the ToAscii BSU (FIG. 6), the behavior computation process binds the KeyboardState value to the arguments made in the ToAscii calls as shown by call line C1 of the ToAscii BSU (FIG. 6).

A key press event may also be captured through the behaviour represented by the GetKeyNameText BSU (FIG. 5). The GetKeyNameText BSU (FIG. 5) is a leaf level BSU and child of the GetKeyPress BSU (FIG. 4). The GetKeyNameText BSU function captures the key event and the actual key pressed. For example, if a user presses a backspace key that is tracked by a key logger, the GetKeyNameText BSU (FIG. 5) identifies the key press as a backspace and returns the value to the BSU calling function shown by line B3 line under the GetKeyPress BSU (FIG. 4).

As shown by the KeyLoggerToFile BSU (FIG. 3) when a key press is captured by a key logger it is identified by the GetKeyPress BSU (FIG. 4) and written to a file through the FileWriteComplete BSU (FIG. 8). In operation, the FileWriteComplete BSU (FIG. 8) references BSUs that represent the behaviour of opening the file (FileOpenWrite BSU, FIG. 9), writing to that open file (FileWrite, FIG. 10) and closing the open file (FileClose, FIG. 11) after the open file is written to. At the leaf level, there are eleven different ways in which the exemplary FileOpenWrite BSU (FIG. 9) may open a file in Windows that can be written to (as shown by the call functions of the FileOpenWrite BSU). The FileWrite BSU (FIG. 10) may invoke four different function calls to write to the open file. And, the FileClose BSU (FIG. 11) may invoke two different function calls to close the file.

Figure 12:
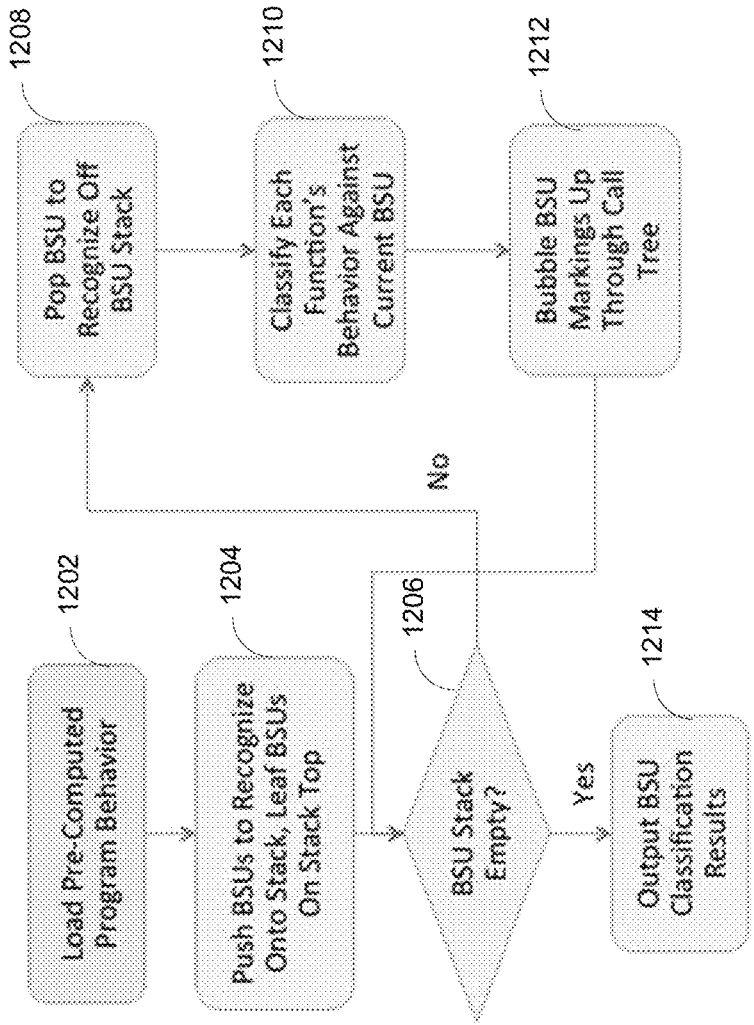
FIG. 12 is a BSU recognition process flow.

Using the hierarchical BSU structure, the behavior computation process (also referred to as the BSU classification process flow) classifies the behaviour of various malware, viruses, etc., that are unauthorized, disable, interrupt, and/or damage computers. As shown in FIG. 12, an exemplary behavior computation process loads the functional behaviour specifications of local functions from the program analysis repository or library into computing memory for analysis at 1202. The BSU hierarchy is also loaded into the computing memory. The process then pulls the leaves, branches, and trunk of the BSUs onto a program stack sequentially at 1204, which may comprise a Last-In-First-Out (LIFO) data structure. A stack is a restricted data structure, as only a limited number of operations are performed on it. In the LIFO data structure, the last element added to the structure is the first one to be removed by the processor. In other words, elements are removed from the stack in the reverse order of their addition, with the lowest members being those that have been on the stack the longest. A key logging BSU classification flow, for example, may be executed in any of the tree stack ordering sequence shown below.

| Stack Ordering 1 | Stack Ordering 2 | Stack Ordering 3 |
| --- | --- | --- |
| FileOpenWrite | GetKeyboardState | GetKeyboardState |
| FileWrite | ToAscii | ToAscii |
| FileClose | GetKeyNameText | GetKeyNameText |
| FileWriteComplete | GetKeyPress | FileOpenWrite |
| GetKeyboardState | FileOpenWrite | FileWrite |
| ToAscii | FileWrite | FileClose |
| GetKeyNameText | FileClose | FileWriteComplete |
| GetKeyPress | FileWriteComplete | GetKeyPress |
| KeyLoggerToFile | KeyLoggerToFile | KeyLoggerToFile |

In alternative systems and processes, other orderings of the stack are executed. A valid stack ordering is one where all of lower level BSUs used by a higher level BSU have been recognized before recognizing the higher level BSUs.

In FIG. 12, when the BSU stack is not empty, a BSU is removed by a pop function at 1208, causing a processor to analyze the functionality of the targeted program in view of the behavior abstracted to the BSUs at 1210 and when a match is found, the behavior computation process inserts a program marker in the call list, which the process bubbles up (the match) through the program call tree at 1214. If the stack is not empty at 1206 the behavior computation process performs BSU matching against the remaining BSUs in the BSU stack, collects the markings, bubbles those markings up through the program call tree (as defined by the local function calls made within the analysed program) before analysing the behavior functionality and the next highest BSU level until it traverses the entire BSU hierarchy. In some systems, markings are bubbled up through propagation phases that may mark all their appearances and repeat the propagation phase which bubbles up the marking up the program call trees.

Besides key logging, the behavior computation processes and BSU systems have many other uses, such detecting process software code injection under Windows, detecting various anti-virtualization processes, anti-sandboxing processes, debugging techniques, etc. Further, in other alternative systems, different BSUs recognize FTP and HTTP operations allowing the BSUs to perform many different detections and classifications.

The problem of identifying the starting point of execution of a program, which in compiled software is especially difficult and even more challenging in legacy applications, is solved in an alternate system referred to as a finding main (system) in an alternative embodiment of this disclosure. In the C language the function called at program startup is named main. The main( ) function is defined with a return type of "int" and with no parameters (as shown below):

int main(void) {/* . . . */} or with two parameters (referred to here as "argc" and "argv," though any names may be used, as they are local to the function in which they are declared) as shown below:

int main(int argc, char *argv[ ]) {/* . . . */} or, optionally (under Windows), int main(int argc, char *argv[ ], char *envp[ ])
        {/* . . . */}

The special function named main is the starting point of execution for C and C++ programs. The main function is not predefined by the compiler. It is supplied in the program text. Thus, the execution of the user-defined functionality of a C/C++ program starts at main( ) and main( ) will have 2, 3, or 0 arguments.

For each local function, the finding main system computes a path based complexity measure. The path based complexity measure increases as the number of potential software execution paths through the local function increases. The path based complexity measure computation steps into called functions, so the complexity of called functions is reflected in the complexity of the calling function. Since the complexity is very large for some programs, the finding main system uses a log scale for the path based complexity measure. For example, for the statement, 'if a b( ); else c( ); d; if e f( ); else g( );' the complexity is $\log_{10}(4)$, that is, there are four possible execution paths.

To detect main, the finding main system computes the complexity of the local functions of a program and identifies main ( ) by identifying the function with the highest path based complexity measure that accepts two or three arguments (zero argument main( ) functions tend to be rare). In other words, the system processes all of the local functions, and identifies main( ) as the code section having the highest path based complexity passing two to three arguments.

To visualize the functional calls in software, like the software described above a interactive, dynamic visualization user interface allows users to explore the graph to view only the functions that can reach or are reachable by selected function. The functions are color coded by their ancestral relation and their function call distance to the selected function of interest. In some systems the user interface applies different color scales and adapts a color mapping function through a color algorithm to support tasks like calling out localizations and identification of processes and/or values. The disclosed processes and systems allows the dynamic visualization user interface to render analysis by visually identifying and differentiating the relations of other functions of the program to that at a glance.

Initially, the dynamic visualization user interface may render the entirety of a call graph with no special formatting on a display. The user interface allows the user to select the vertex for a function that is tracked by a trace. When a function is selected (automatically or by a user), the user interface renders a graph that hides all functions that do not precede the selected function in the call chain or cannot be reached through a chain of function calls from that function without deleting them from memory. So, the dynamic visualization user interface may render a partial view that displays part of a call graph that is reachable by that function or another function, or the entire functions without having to recreate it.

The function-driven color-coding visualization rendered by the coloring algorithm identifies which functions precede the selected function (that is, the functions that can reach the selected function through some chain of function calls) and which functions follow the selected function (that is, the functions that can be reached from the selected function through some chain of function calls). In one system and process, the saturation of the colors on a display indicates a relative call distance (the minimum number of function calls needed to reach the selected function or to be reached from the selected function) of a function to the selected function.

For example, a selected function may be colored white in one color-coding approach. Preceding functions are colored to different color scales, for example, some shade of red, with lighter, less saturated reds having a shorter function call distance to the selected function. Functions following the selected function may be colored in an alternative range of colors on a computer display and may comprise an alternative color such as a primary color such as some shade of blue, with lighter, less saturated blues having a shorter function call distance to the selected function. In the case that a function can both precede and follow the selected function, it may be colored in yet another primary color or alternatively a differentiated colored some shade of violet, with lighter, less saturated violets having a shorter function call distance.

The function-driven distance measuring color-coding algorithm for the ancestor and descendant coloring may first execute a breadth-first search following backward-edges to locate and identify the preceding functions that are coupled to the selected function, keeping track of and storing the processing distance along functional call path by updates to memory. When the breadth-first search encounters a function that hasn't been marked as an ancestor, it marks that function as an ancestor and it sets its function call distance to the current depth of the breadth-first search.

After performing the breadth-first search that identifies the preceding functions and their function call distance to the selected function, the function-driven distance measuring color-coding algorithm executes a second breadth-first search that identifies the functions that follow the selected function and their function call distance from the selected function. When the second breadth-first search encounters a function that hasn't been previously marked as either an ancestor or descendant, it marks that function as a descendant in memory and it sets its function call distance to the current depth of the breadth-first search.

If the second breadth-first search encounters a function that has been previously marked as an ancestor by the first breadth-first search, then it is marked as both an ancestor and a descendant. If the ancestor-descendant function's current function call distance to the selected function is greater than the current depth of the second breadth-first search, then its function call distance is set to the current depth of the second breadth-first search, since it was established as a shorter distance.

The dynamic visualization user interface allows users to further explore the call graph by selecting functions that precede and follow the selected function in the current function call graph visualization. Some user selections of preceding functions reveal more parts of the call graph, as more functions are reachable from ancestral nodes. Selecting functions that follow that function automatically hide paths and functions of the graph that were reachable by the previously selected function but not reachable by the newly selected function. While the paths and functions are hidden, they are not deleted which would force the user interface to recreate them if they are to be later rendered. As a point of reference for the following examples, the "main" function of the visualized programs is the root of the function call graph. In these examples, the main precedes all other functions in the function call graph; the entire function call graph can be viewed by selecting main.

Figure 13:
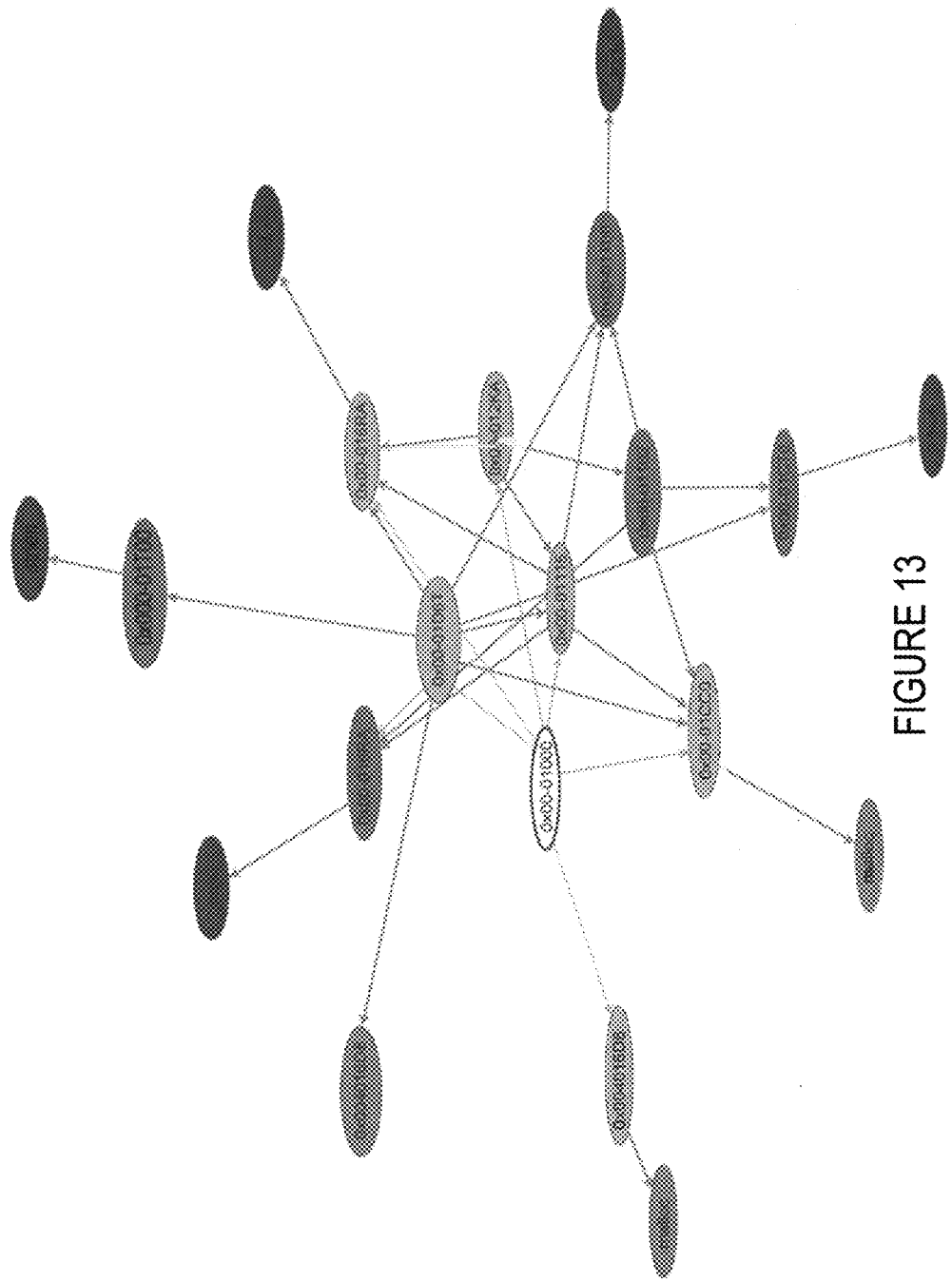
FIG. 13 is a distant view of a function call graph.

For example, consider tracing a program that parses a dice-rolling expression given as input by the user (such as 2d6+4, which means roll 2 6-sided dice and add 4 to the result) and produces a pseudo-random integer result from the dice roll. It is shown in FIG. 13 called DeterministicDice.exe. FIG. 13 shows a distant view of the exemplary function call graph for the program, with the "main" function selected (which is not shaded). Since all functions in the program follow main, all the other functions are colored a shade of blue, proportional to their function call distance from main. The arrows show us the direction in which functions are called, with the caller functions being at the tail end of the arrows and the callee functions being at the head-end of the arrows.

Figure 14:
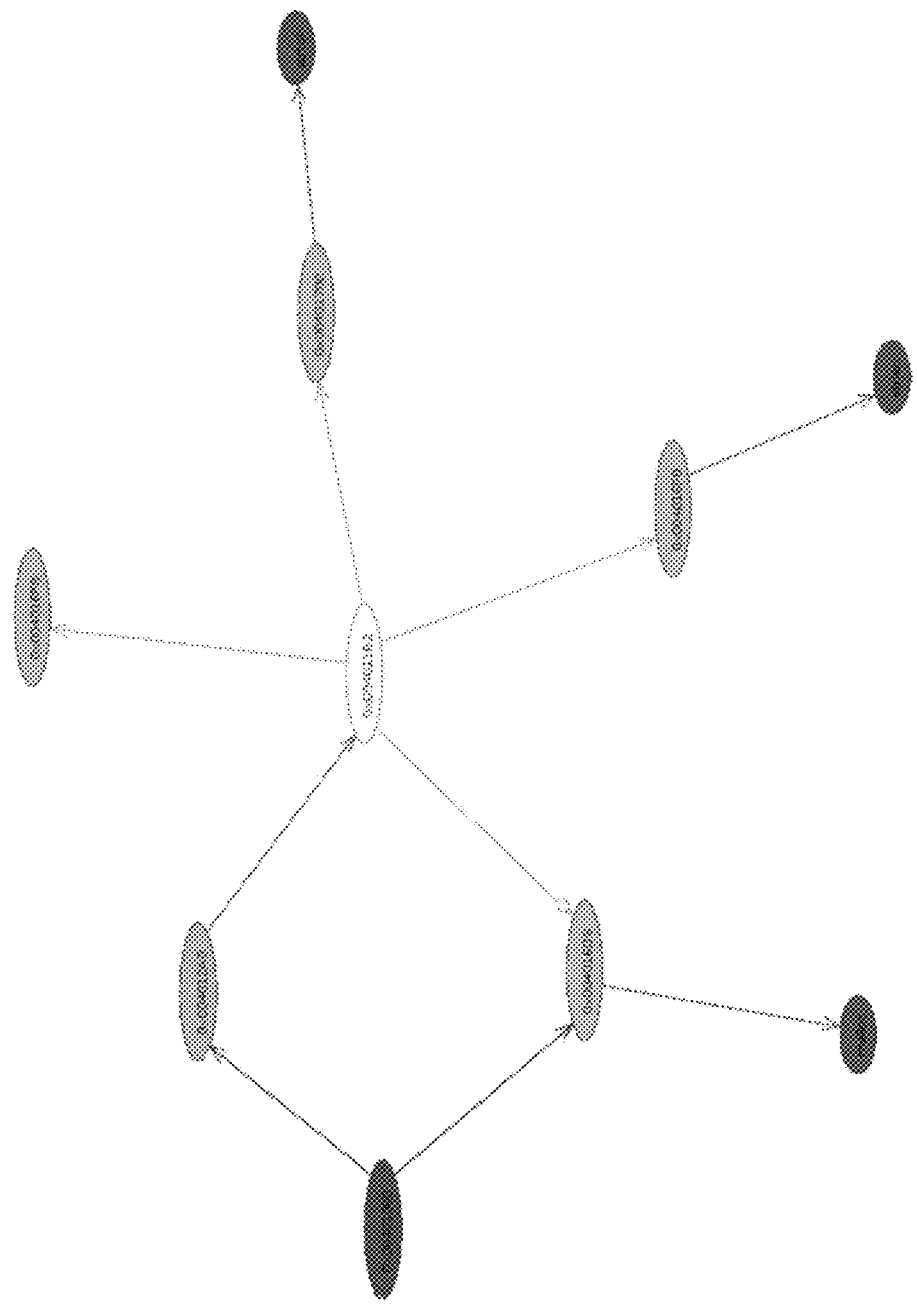
FIG. 14 is a near view of a local function.

FIG. 14 shows a close-up view of the local function at 0x004011B2 selected. The view of the function call graph for the program is filtered by the dynamic visualization user interface to show only the functions that precede and follow this local function. Functions that precede it, including main, are colored a shade of red, proportional to their function call distance from local function 0x004011B2. Functions that follow after local function 0x004011B2 are colored to a different color and scale such a shade of blue, proportional to their function call distance from it.

Figure 15:
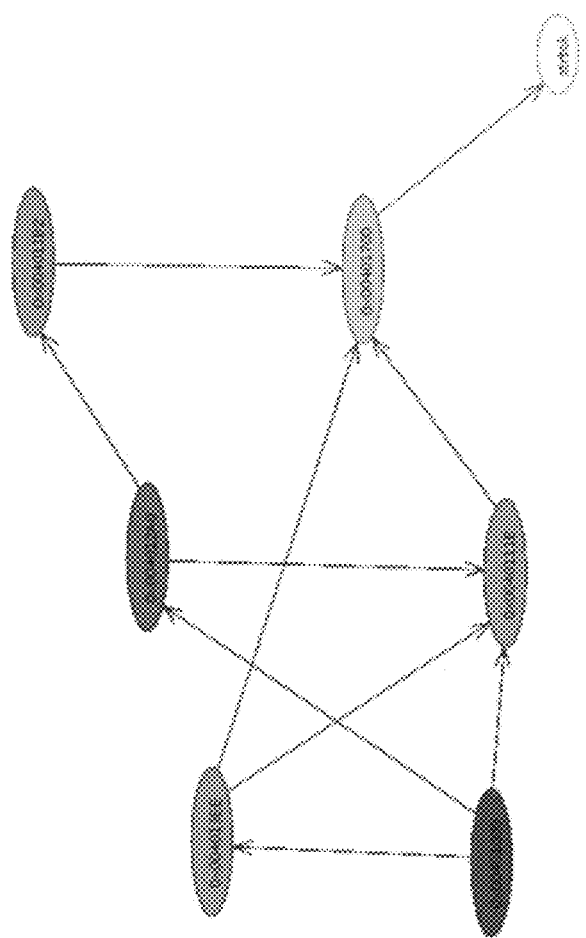
FIG. 15 is a selected external function.

FIG. 15 displays the external function "strtok" when selected. The external function comprises C function used to tokenize a string. Here, the view is automatically filtered to show only the paths of local functions that precede it that were called by the program.

Figure 16:
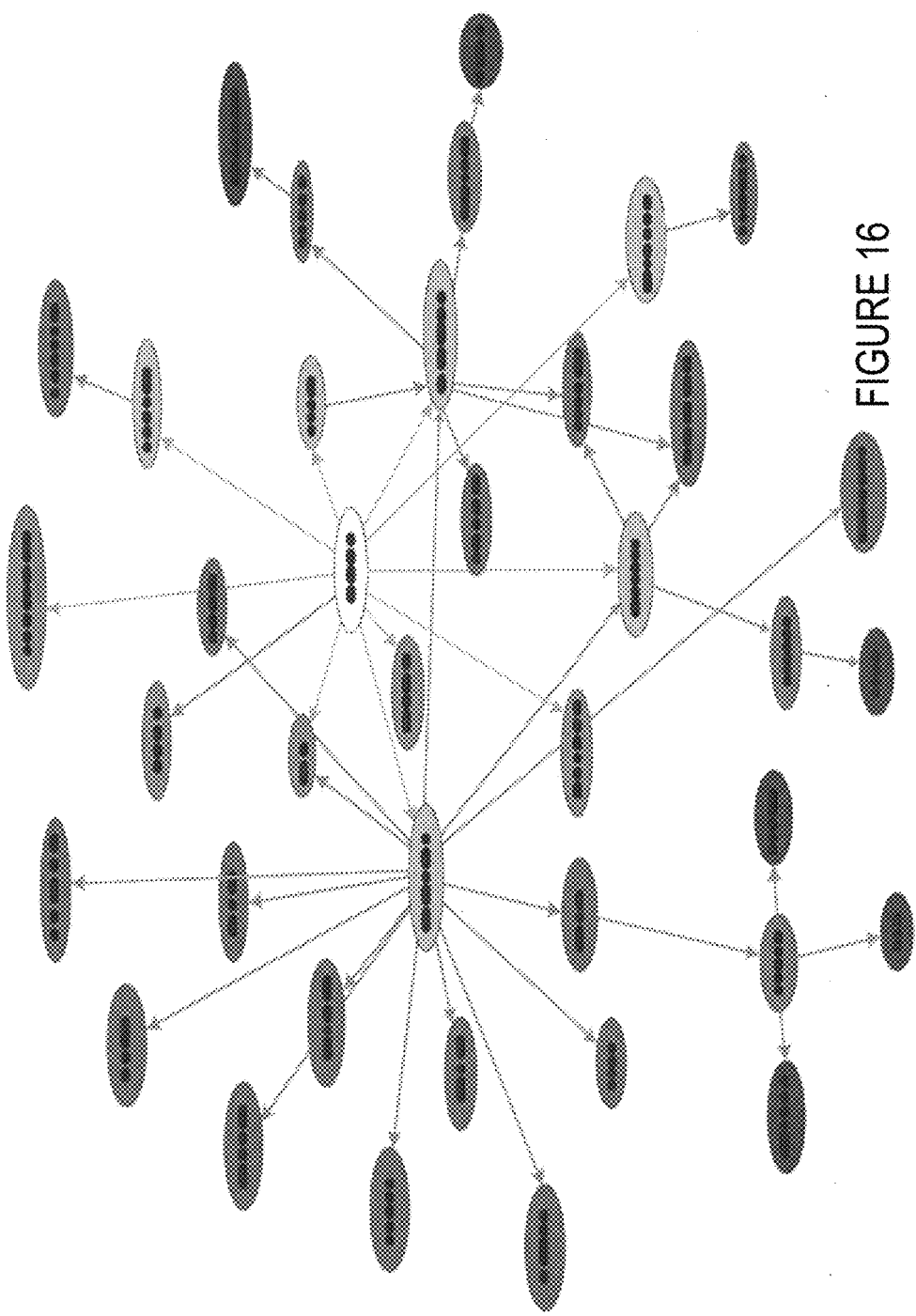
FIG. 16 is a second distant view of another function call graph.
Figure 17:
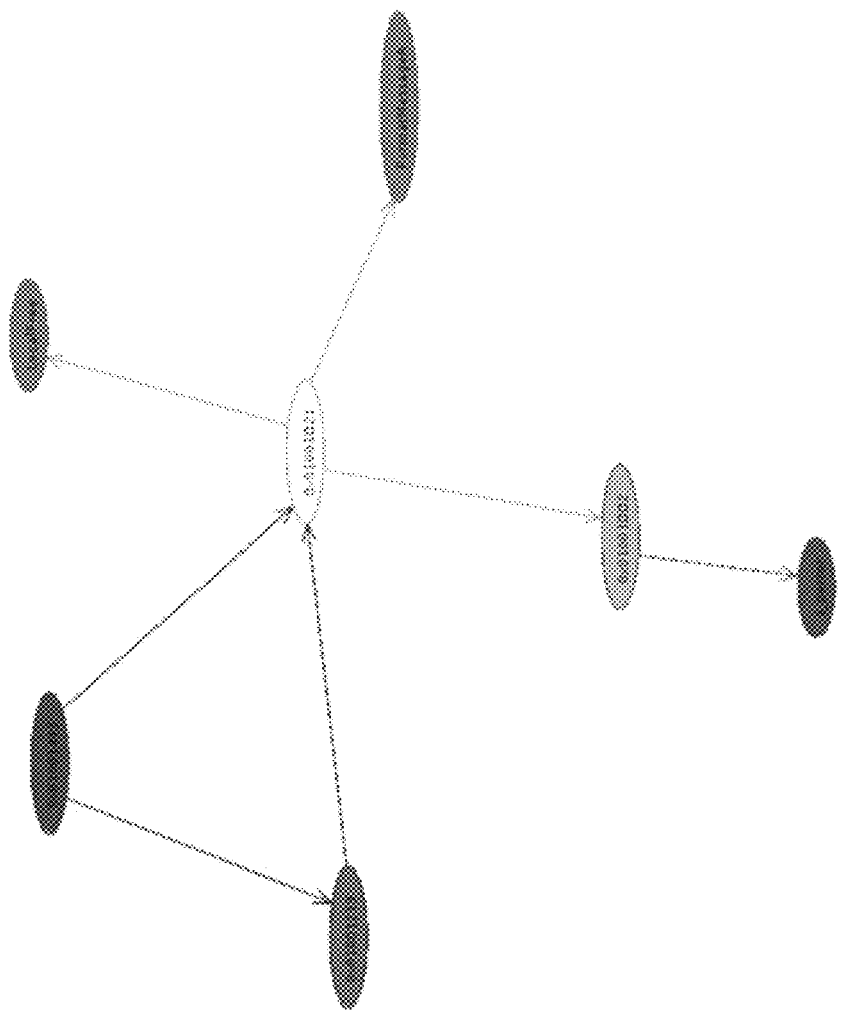
FIG. 17 is a near filtered view of another local function.

In another example, the dynamic visualization user interface automatically analyzes a utility program, which displays information about a user on a remote computer (usually one running UNIX) running the Finger service or daemon. It is called finger.exe. FIG. 16 shows a distant view of the entire function call graph for the program with main selected and FIG. 17 shows a close-up, filtered view of the graph with the local function 0x01001D21 selected. The two local functions that precede it in the program are displayed in red, with main (0x01001493) being the deepest shade of red. The functions that follow local function 0x01001D21, including the external functions "FormatMessageA", "LocalFree", and "s_perror" are colored shades of blue.

Figure 18:
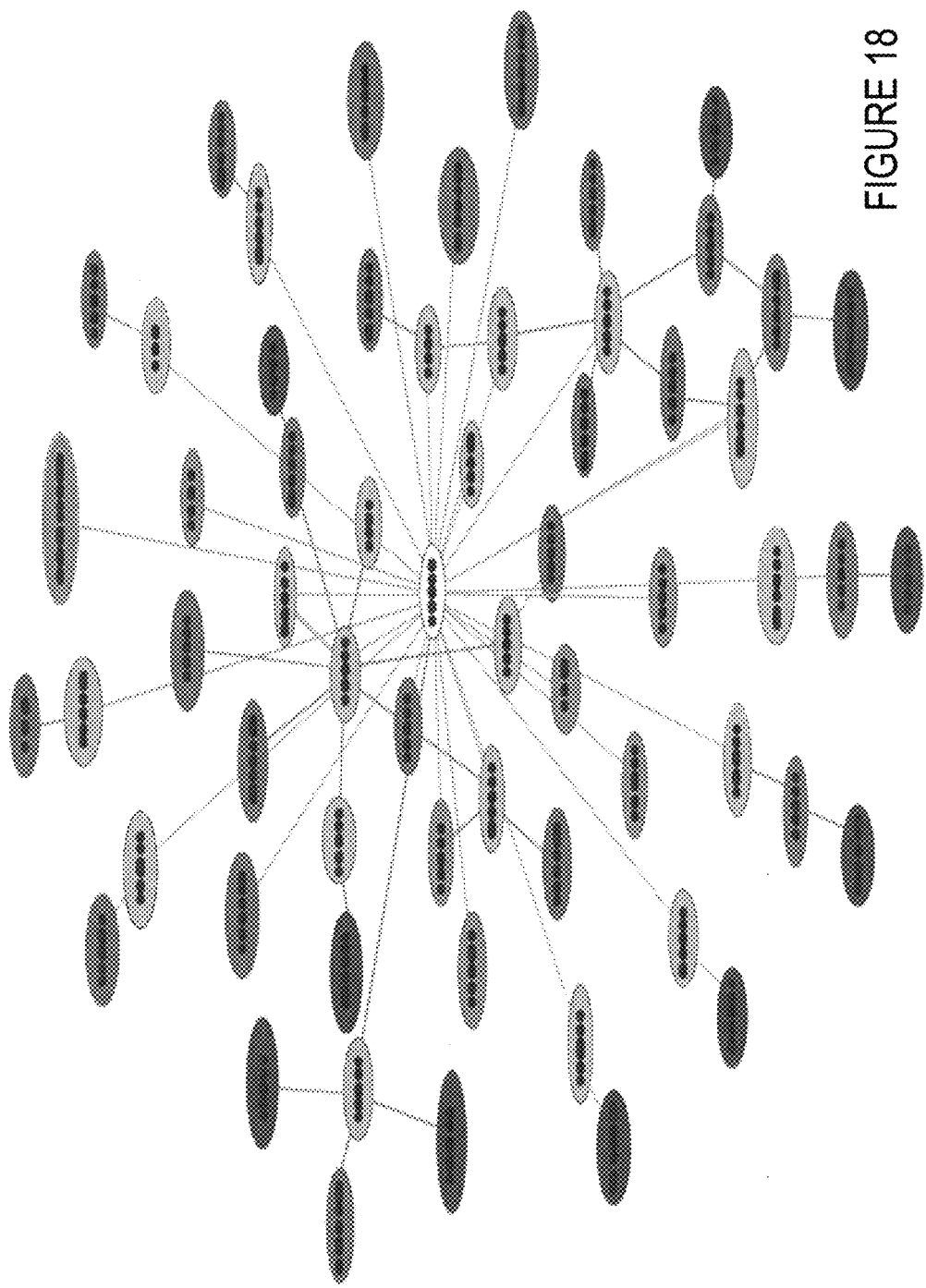
FIG. 18 is a distant view of another function call graph.
Figure 19:
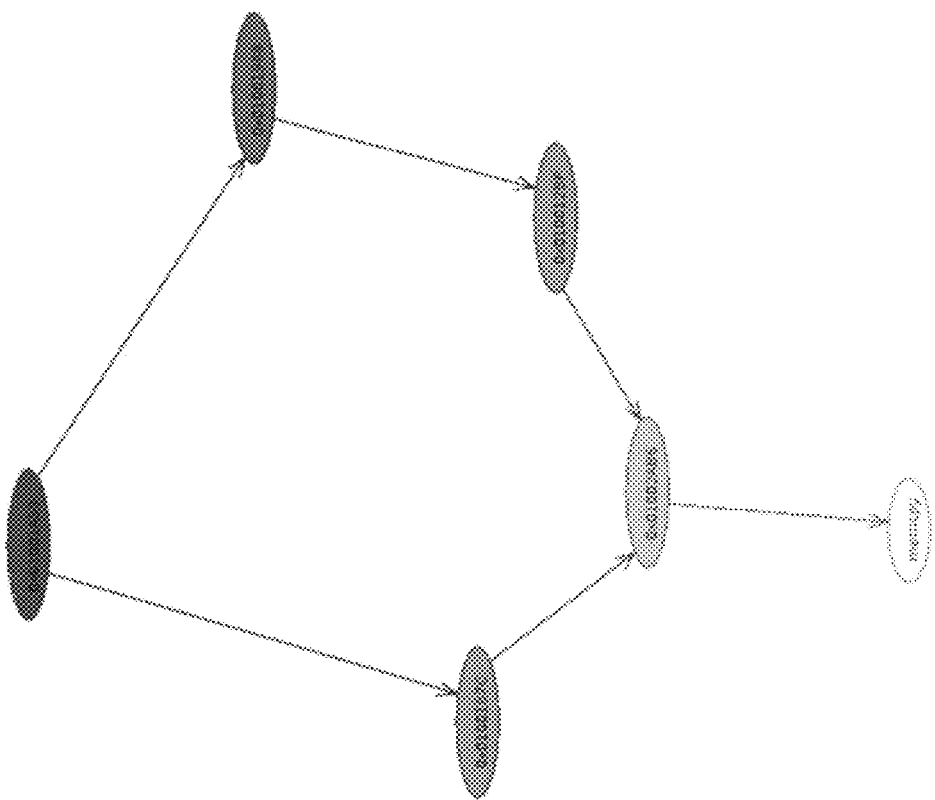
FIG. 19 is a near filtered view of another local function.

The dynamic visualization user interface may automatically analyze diagnostic software too such as a diagnostics program that performs network diagnostics and reachability for a remote computer at an IPv4 or IPv6 address called PING.exe FIG. 18 shows a distant view of the function call graph for an entire program and FIG. 19 shows a close-up view of selected the external function "memcpy", a standard C function used to copy bytes from one block of memory to another. With "memcpy" selected, the dynamic visualization user interface view of the function call graph for the program is automatically filtered to only display the paths of function calls leading to "memcpy" while hiding the remaining paths.

The methods, devices, systems, and logic described above may be implemented in many different ways in many different combinations of hardware, software or both hardware and software. For example, all or parts of the system may diagnose software or circuitry in one or more controllers, one or more microprocessors (CPUs), one or more signal processors (SPU), one or more graphics processors (GPUs), one or more application specific integrated circuit (ASIC), one or more programmable media or any and all combinations of such hardware. All or part of the logic, specialized processes, and systems described may be implemented as instructions for execution by multi-core processors (e.g., CPUs, SPUs, and/or GPUs), controller, or other processing device including exascale computers and compute clusters, and may be displayed through a display driver in communication with a remote or local display, or stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The systems may evaluate software and data structures through processors (e.g., CPUs, SPUs, GPUs, etc.), memory, interconnect shared and/or distributed among multiple system components, such as among multiple processors and memories, including multiple distributed processing systems. Parameters, databases, software and data structures used to evaluate and analyze these systems or logic may be separately stored and managed, may be incorporated into a single memory or database, may be logically and/or physically organized in many different ways, and may implemented in many ways, including data structures such as linked lists, programming libraries, or implicit storage mechanisms. Programs may be parts (e.g., subroutines) of a single program, separate programs, application program or programs distributed across several memories and processor cores and/or processing nodes, or implemented in many different ways, such as in a library, such as a shared library. The library may store behavior abstractions that performs analyze the behavior functionality described herein. While various embodiments have been described, it will be apparent to those of ordinary skill in the art that many more embodiments and implementations are possible.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a significant amount. When devices are responsive to or occur in response to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for analyzing compiled software code using a computer comprising a processor and a memory, the method comprising:
    processing the compiled software code to generate an optimized functional call path model including parsing the compiled software code to facilitate identification of a plurality of preceding functions and a plurality of subsequent functions coupled to a selected function to identify functions for inclusion in the optimized functional call path model;
    processing the compiled software code to measure the functional call distances from each of the identified functions and the selected functions included in the optimized functional call path model; and
    storing, in the memory, a representation of the compiled software code by storing the optimized functional call path model of the compiled software code with selected measured functional call distances, thereby facilitating analysis of the compiled software code to identify a main function of the compiled software of a C++ program;
    wherein the main function of the C++ program is identified by a number of arguments passed by the main function to another function and a measure of computation steps executed.

2. The computer implemented method of claim 1 wherein the main function of the C++ program is identified by the number of arguments passed to a receiving function being two or three arguments.

3. The computer implemented method of claim 1 wherein the main function of the C++ program is identified by the number of computation steps executed by the identified functions or selected function.

4. The computer implemented method of claim 1 wherein the functional call distances comprise the measure of computation steps executed being a highest number of steps executed.

5. The computer implemented method of claim 1 further comprising rendering a portion of the optimized functional call path model through a user interface.

6. The computer implemented method of claim 1 further comprising rendering a portion of an entire optimized functional call path model, the entire optimized functional call path model is stored in the memory.

7. The computer implemented method of claim 6 wherein the entire optimized functional call path model is rendered by selecting a representation on a user interface designated main.

8. The computer implemented method of claim 1 wherein the optimized functional call path model of the compiled software code identifies the main function of the compiled software of the C++ program and a C program.

9. The computer implemented method of claim 1 wherein the representation of the measured functional call distances are rendered in a shade of color proportional to their measured functional call distances.

10. A non-transitory machine readable medium encoded with machine-executable instructions that analyzes compiled software code, wherein execution of the machine-executable instructions is for:
    processing the compiled software code to generate an optimized functional call path model including parsing the compiled software code to facilitate identification of a plurality of preceding functions and a plurality of subsequent functions coupled to a selected function to identify functions for inclusion in the optimized functional call path model;
    processing the compiled software code to measure the functional call distances from each of the identified functions and the selected functions included in the optimized functional call path model; and
    storing, in the memory, a representation of the compiled software code by storing the optimized functional call path model of the compiled software code with selected measured functional call distances, thereby facilitating analysis of the compiled software code to identify a main function of the compiled software of a C++ program;
    wherein the main function of the C++ program is identified by a number of arguments passed by the main function to another function and a measure of computation steps executed.

11. The non-transitory machine readable medium as defined in claim 10 wherein the main function of the C++ program is identified by the number of arguments passed to a receiving function being two or three arguments.

12. The non-transitory machine readable medium as defined in claim 10 wherein the main function of the C++ program is identified by the number of computation steps executed by the identified functions or selected function.

13. The non-transitory machine readable medium as defined in claim 10 wherein the functional call distances comprise the measure of computation steps executed being a highest number of steps executed.

14. The non-transitory machine readable medium as defined in claim 10 further comprising rendering a portion of the optimized functional call path model through a user interface.

15. The non-transitory machine readable medium as defined in claim 10 further comprising rendering a portion of the entire optimized functional call path model stored in the memory through a user interface.

16. The non-transitory machine readable medium as defined in claim 15 wherein the entire optimized functional call path model is rendered by selecting a representation on the user interface designated main.

17. The non-transitory machine readable medium as defined in claim 10 wherein the optimized functional call path model of the compiled software code identifies the main function of the compiled software of the C++ program and a C program.

18. The non-transitory machine readable medium as defined in claim 10 wherein the representation of the measured functional call distances are rendered in a shade of color proportional to their measured functional call distances.

* * * * *